United States Patent
Shibata et al.

(10) Patent No.: US 12,334,795 B2
(45) Date of Patent: Jun. 17, 2025

(54) ROTARY ELECTRICAL MACHINE REFRIGERANT FLOW PASSAGE PARTITION WALL GAP

(71) Applicant: MITSUBISHI HEAVY INDUSTRIES ENGINE & TURBOCHARGER, LTD., Sagamihara (JP)

(72) Inventors: Naomichi Shibata, Kanagawa (JP); Tokio Morohoshi, Tokyo (JP); Yudai Fujioka, Tokyo (JP); Takashi Fukunaga, Tokyo (JP); Takayoshi Fujii, Tokyo (JP); Toshiaki Kawabata, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 230 days.

(21) Appl. No.: 17/908,409

(22) PCT Filed: Mar. 4, 2021

(86) PCT No.: PCT/JP2021/008431
§ 371 (c)(1),
(2) Date: Aug. 31, 2022

(87) PCT Pub. No.: WO2021/177403
PCT Pub. Date: Sep. 10, 2021

(65) Prior Publication Data
US 2023/0089893 A1    Mar. 23, 2023

(30) Foreign Application Priority Data
Mar. 4, 2020   (JP) .................................. 2020-036916

(51) Int. Cl.
*H02K 5/24* (2006.01)
*H02K 5/20* (2006.01)

(52) U.S. Cl.
CPC ............... *H02K 5/24* (2013.01); *H02K 5/203* (2021.01)

(58) Field of Classification Search
CPC ............. H02K 5/20; H02K 5/203; H02K 5/24
See application file for complete search history.

(56) References Cited

U.S. PATENT DOCUMENTS

| 4,844,718 A | 7/1989 | Schmidt et al. |
| 10,361,603 B2 | 7/2019 | Aizawa et al. |
| (Continued) | | |

FOREIGN PATENT DOCUMENTS

| JP | 49-110216 U | 9/1974 |
| JP | 64-30663 A | 2/1989 |
| (Continued) | | |

OTHER PUBLICATIONS

Shibuya (JP 2017127118 A) English Translation (Year: 2017).*
(Continued)

*Primary Examiner* — Tulsidas C Patel
*Assistant Examiner* — Robert E Mates
(74) *Attorney, Agent, or Firm* — Birch, Stewart, Kolasch & Birch, LLP

(57) ABSTRACT

A rotary electrical machine includes a housing which includes a flow passage portion in which a refrigerant flow passage through which a refrigerant flows is formed and which houses a rotor and a stator. The refrigerant flow passage includes a first flow passage of which a length from the inlet to the outlet in the circumferential direction is a predetermined length, and a second flow passage of which a length from the inlet to the outlet in the circumferential direction is shorter than that of the first flow passage. The second flow passage is provided with a partition wall portion between the inner peripheral wall and the outer peripheral wall in the radial direction. A slit penetrating the partition
(Continued)

wall portion in the circumferential direction is formed in the partition wall portion. A width of the slit is smaller than a width of the first flow passage.

4 Claims, 9 Drawing Sheets

(56) References Cited

U.S. PATENT DOCUMENTS

| | | |
|---|---|---|
| 2016/0276895 A1 | 9/2016 | Aizawa et al. |
| 2021/0194298 A1* | 6/2021 | Söntgerath ............ H02K 5/203 |

FOREIGN PATENT DOCUMENTS

| | | | |
|---|---|---|---|
| JP | 2009-303367 A | 12/2009 | |
| JP | 2014-236613 A | 12/2014 | |
| JP | WO2015/093138 A1 | 6/2015 | |
| JP | 2016-46853 A | 4/2016 | |
| JP | 2017127118 A * | 7/2017 | |
| JP | 2018-157644 A | 10/2018 | |
| JP | 2019-103245 A | 6/2019 | |
| WO | WO-2016195148 A1 * | 12/2016 | ............ H02K 15/14 |

OTHER PUBLICATIONS

Byungwook (WO 2016195148 A1) English Translation (Year: 2016).*
International Search Report and Written Opinion of the International Searching Authority for International Application No. PCT/JP2021/008431, dated May 11, 2021, with English translation.

* cited by examiner

FIG. 2
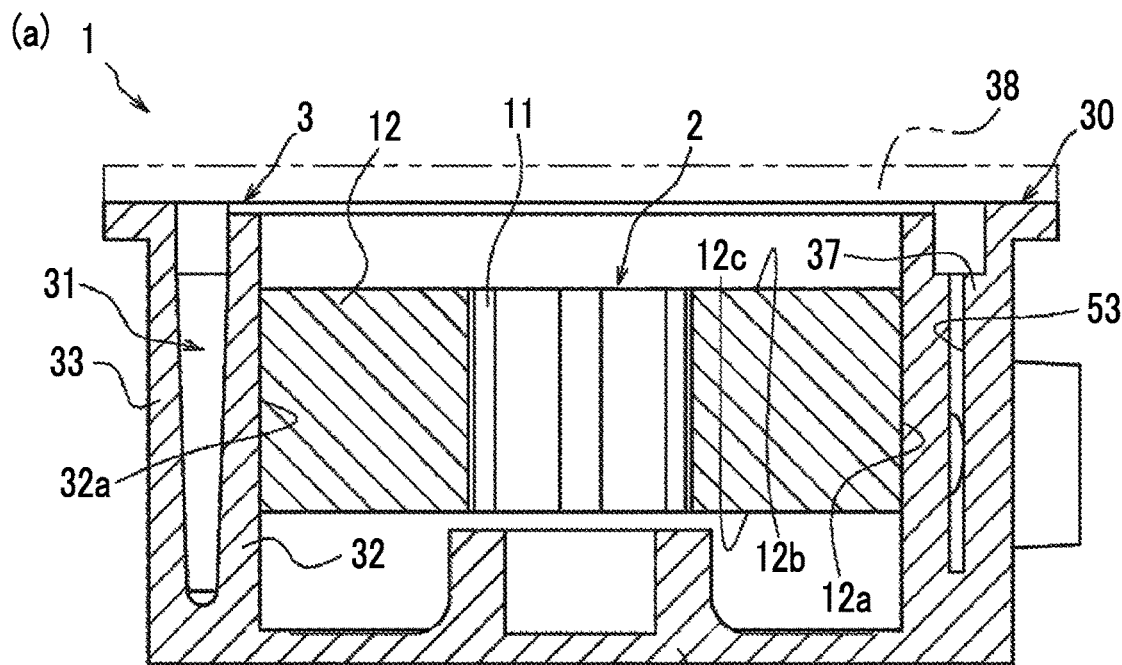
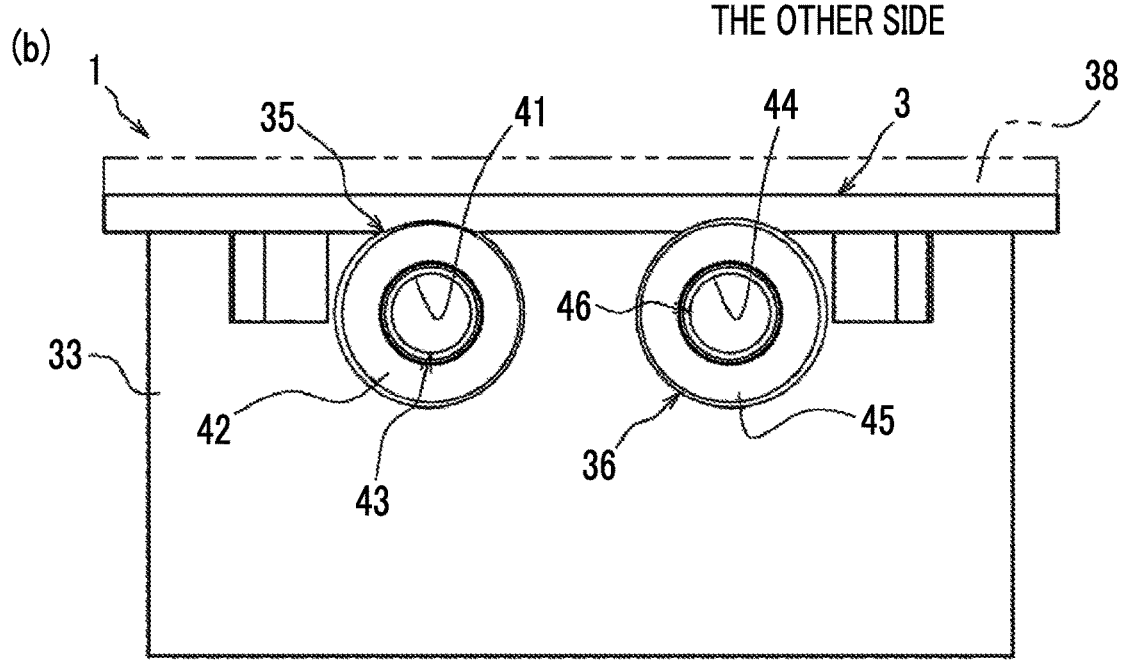

FIG. 6
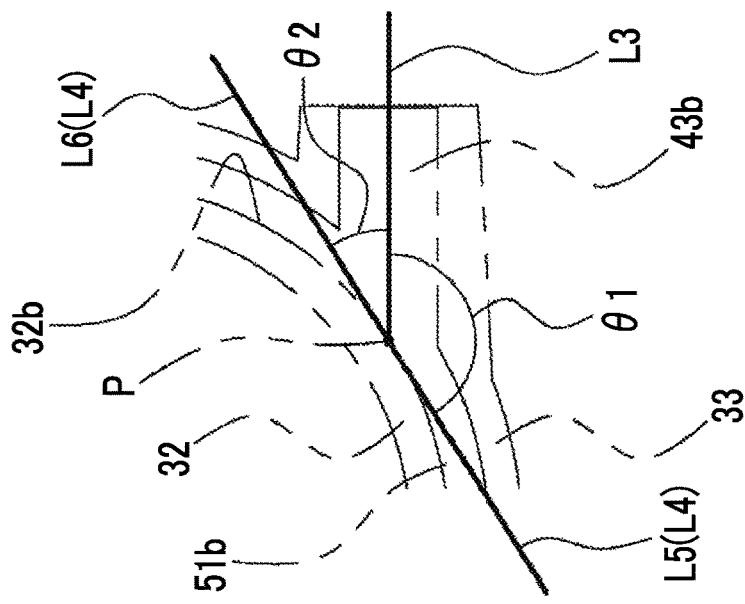
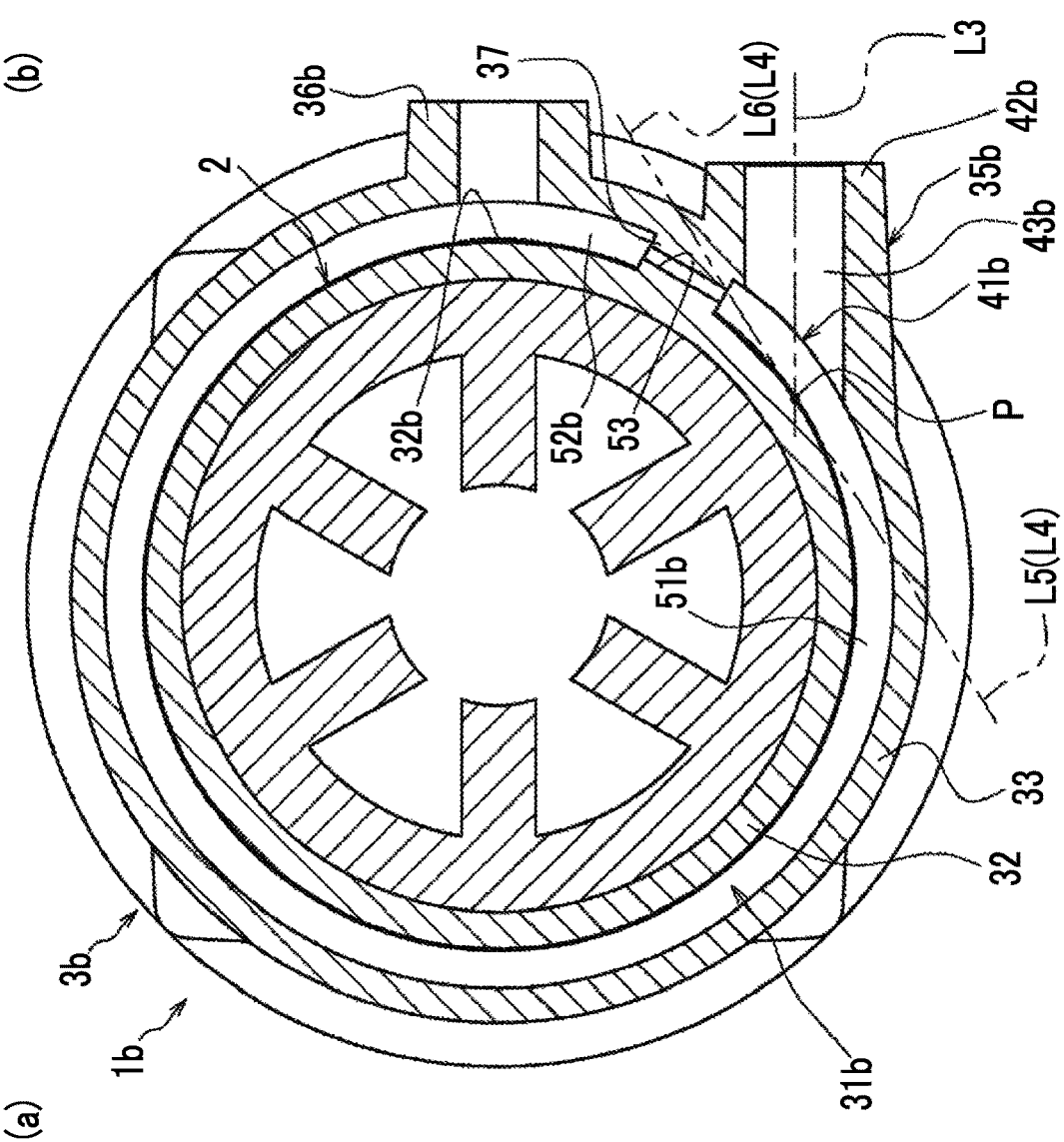

ROTARY ELECTRICAL MACHINE REFRIGERANT FLOW PASSAGE PARTITION WALL GAP

TECHNICAL FIELD

The present invention relates to a rotary electrical machine.

BACKGROUND ART

Each of rotary electrical machines disclosed in PTLs 1 and 2 includes a rotor, a stator that is disposed outside the rotor in a radial direction, and a housing in which the stator is housed. The stator includes a tubular yoke portion and tooth portions that extend inward from the yoke portion in a radial direction. The rotary electrical machines are adapted to generate a rotating magnetic field in a case where current flows through coils wound around the tooth portions and to rotate the rotor via a magnetic force generated by the rotating magnetic field.

A refrigerant flow passage through which a refrigerant for cooling the stator and the like flows is formed in the housing. The housing includes, as components forming the refrigerant flow passage, an inner peripheral wall that is in contact with an outer peripheral surface of the stator, an outer peripheral wall that is disposed outside the inner peripheral wall in the radial direction, and a partition wall portion that is disposed between the inner peripheral wall and the outer peripheral wall in the radial direction. The partition wall portion is provided at a part of the housing in a circumferential direction and connects the inner peripheral wall to the outer peripheral wall. An inlet of the refrigerant flow passage is formed in the vicinity of the partition wall portion, and an outlet of the refrigerant flow passage is formed on a side opposite to the inlet with the partition wall portion interposed between the inlet and the outlet. A refrigerant having flowed into the refrigerant flow passage through the inlet flows almost completely around along the refrigerant flow passage and then flows out of the outlet.

CITATION LIST

Patent Literature

[PTL 1] Japanese Unexamined Patent Application Publication No. 2016-46853

[PTL 2] Japanese Unexamined Patent Application Publication No. 2014-236613

SUMMARY OF INVENTION

Technical Problem

A magnetic force intermittently acts between the rotor and the tooth portions during the rotation of the rotor in the above-mentioned rotary electrical machines, causing the stator to vibrate. In a case where such vibration is transmitted to the inner peripheral wall from the stator and is further transmitted to the outer peripheral wall from the inner peripheral wall through, for example, the partition wall portion, the outer peripheral wall is vibrated and noise may be generated. A method of suppressing the transmission of vibration from the inner peripheral wall to the outer peripheral wall without providing the partition wall portion is conceivable as one of the measures against noise. However, since a short-circuit passage is formed to the outlet from the inlet in this case, there is a concern that a large amount of a refrigerant will likely flow into the short-circuit passage. For this reason, there may be a problem in that the amount of a refrigerant flowing through the refrigerant flow passage in the related art is significantly reduced and that a cooling function significantly deteriorates.

An object of the present invention is to suppress the transmission of the vibration of a stator to an outer peripheral wall of a housing while suppressing the deterioration of a cooling function.

Solution to Problem

A rotary electrical machine according to a first invention includes a rotor that is rotatable using a predetermined axial direction as a direction of an axis of rotation, a stator that is disposed outside the rotor in a radial direction of the rotor, and a housing which includes a flow passage portion in which a refrigerant flow passage through which a refrigerant flows is formed and which houses the rotor and the stator. The flow passage portion includes an inner peripheral wall that is in contact with an outer peripheral surface of the stator, an outer peripheral wall that is disposed outside the inner peripheral wall in the radial direction and that is provided to form the refrigerant flow passage between the outer peripheral wall and the inner peripheral wall, an inlet portion in which an inlet of the refrigerant flow passage is formed at a predetermined position in a circumferential direction orthogonal to both the axial direction and the radial direction, and an outlet portion in which an outlet of the refrigerant flow passage is formed at a position different from the predetermined position in the circumferential direction. The refrigerant flow passage includes a first flow passage of which a length from the inlet to the outlet in the circumferential direction is a predetermined length, and a second flow passage of which a length from the inlet to the outlet in the circumferential direction is shorter than that of the first flow passage. The second flow passage is provided with a partition wall portion between the inner peripheral wall and the outer peripheral wall in the radial direction, a slit penetrating the partition wall portion in the circumferential direction is formed in the partition wall portion, and a width of the slit is smaller than a width of the first flow passage.

In the present invention, the slit penetrating the partition wall portion in the circumferential direction is formed in the partition wall portion, and a gap is formed between a radial outer portion and a radial inner portion of the partition wall portion by the slit. Accordingly, the transmission of the vibration of the stator, which is caused by the rotation of the rotor, from the inner peripheral wall to the outer peripheral wall can be suppressed. However, since a short-circuit passage is formed to the outlet from the inlet by the slit, there is a concern that the amount of a refrigerant flowing into the second flow passage will be increased, the amount of a refrigerant flowing through the first flow passage will be reduced, and a cooling function will deteriorate. Since the width of the slit is smaller than the width of the first flow passage in the present invention in this regard, the flow passage resistance of the second flow passage can be increased. As a result, the flow of a refrigerant into the second flow passage can be suppressed as much as possible. Accordingly, it is possible to suppress the transmission of the vibration of the stator to the outer peripheral wall of the housing while suppressing the deterioration of a cooling function.

According to a second invention, in the rotary electrical machine according to the first invention, the slit extends in the axial direction from at least a position of one end of the outer peripheral surface of the stator to a position of the other end thereof.

In the present invention, the slit extends in the axial direction from at least the position of one end of the outer peripheral surface of the stator to the position of the other end thereof. That is, in any cross-section orthogonal to the axial direction, a portion of the inner peripheral wall which is adjacent to the stator and the outer peripheral wall are separated from each other by the slit. Accordingly, the transmission of the vibration of the stator from the inner peripheral wall to the outer peripheral wall through the partition wall portion can be effectively suppressed.

According to a third invention, in the rotary electrical machine according to the first or second invention, a supply flow passage connected to the refrigerant flow passage is formed in the inlet portion. Further, in a case where, of a tangent to an outer edge of the inner peripheral wall that passes through an intersection between a center line of the supply flow passage and the outer edge, a straight line extending from the intersection toward the first flow passage is defined as a first straight line and a straight line extending from the intersection toward the second flow passage is defined as a second straight line as viewed in the axial direction, an angle between the center line and the first straight line is an obtuse angle and an angle between the center line and the second straight line is an acute angle.

In the present invention, an angle between the center line and the first straight line is an obtuse angle and an angle between the center line and the second straight line is an acute angle. Accordingly, in a case where a refrigerant having flowed into the refrigerant flow passage through the supply flow passage hits the outer edge of the inner peripheral wall, the refrigerant easily flows toward the first flow passage and the flow of the refrigerant into the second flow passage is suppressed. Therefore, the deterioration of a cooling function can be more effectively suppressed.

BRIEF DESCRIPTION OF DRAWINGS

FIG. 2(a) is a cross-sectional view taken along line II(a)-II(a) of FIG. 1, and FIG. 2(b) is a diagram viewed in the direction of an arrow II(b) of FIG. 1.

FIGS. 6(a) and 6(b) are diagrams showing a configuration in the vicinity of an inlet of a refrigerant flow passage.

DESCRIPTION OF EMBODIMENTS

Next, an embodiment of the present invention will be described. A direction perpendicular to the plane of paper in FIG. 1 (a vertical direction in the plane of paper in FIGS. 2(a) and 2(b)) is defined as an axial direction. An upper side in the plane of paper in FIGS. 2(a) and 2(b) is defined as one side in the axial direction. A lower side in the plane of paper in FIGS. 2(a) and 2(b) is defined as the other side in the axial direction. A radial direction of a rotor 11 (to be described later), which is a direction orthogonal to the axial direction, will be hereinafter simply referred to as a radial direction. A direction orthogonal to both the axial direction and the radial direction is referred to as a circumferential direction.

(Rotary Electrical Machine)

Figure 1:
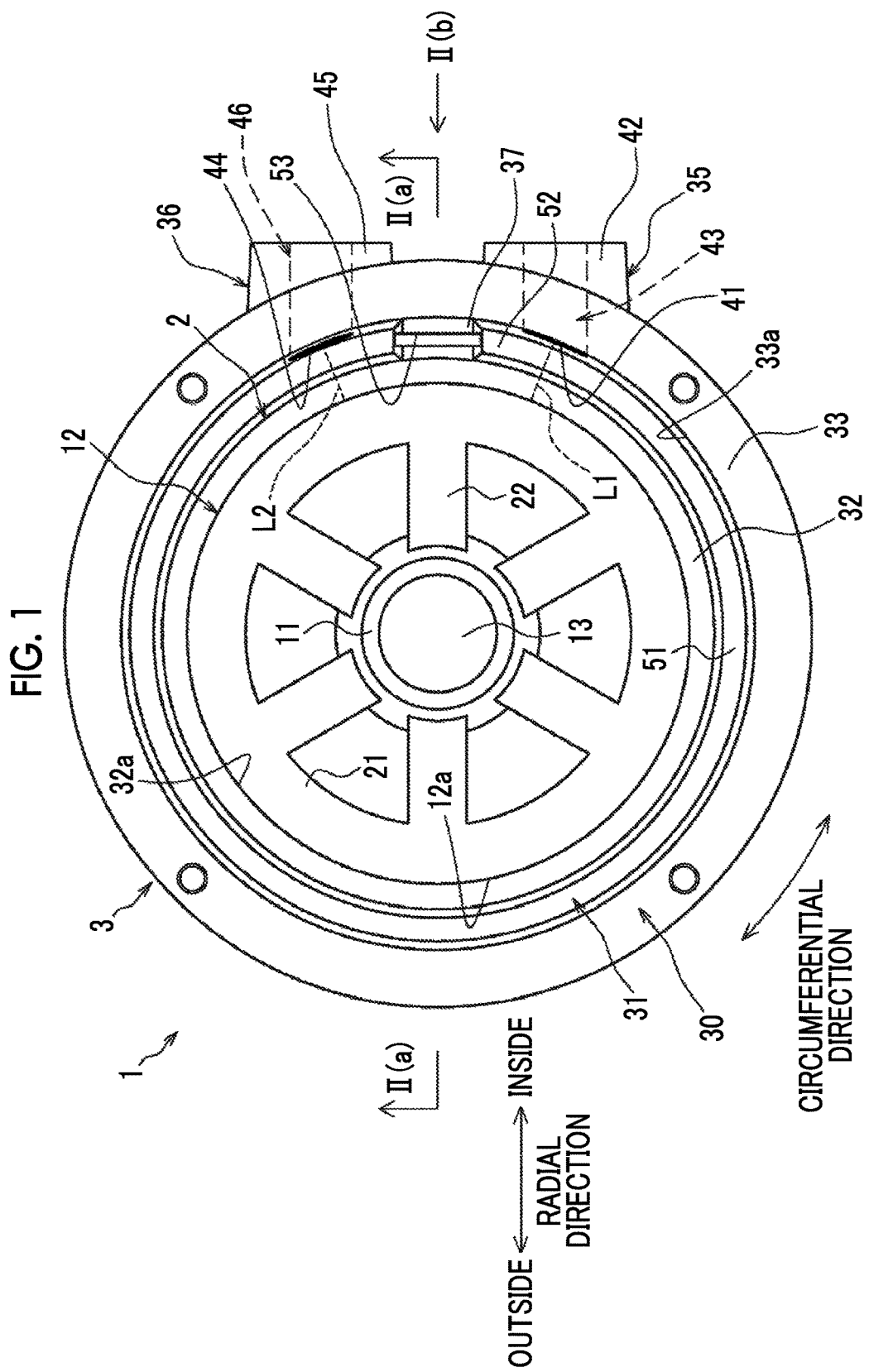
FIG. 1 is a plan view of a rotary electrical machine according to an embodiment.
Figure 3:
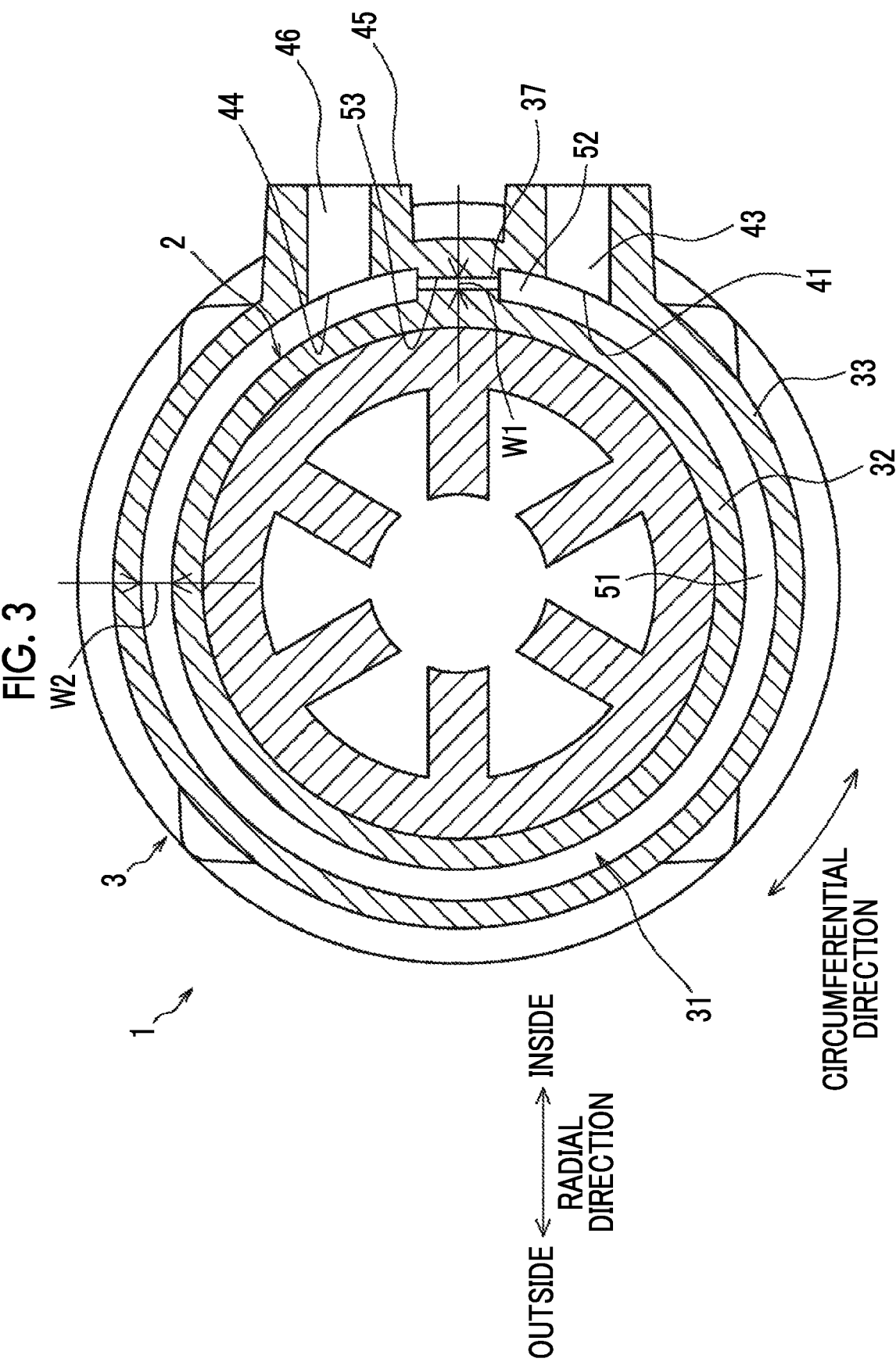
FIG. 3 is a cross-sectional view orthogonal to an axial direction of the rotary electrical machine.

First, the configuration of a rotary electrical machine 1 according to this embodiment will be described with reference to FIGS. 1 to 3. FIG. 1 is a plan view of the rotary electrical machine 1. FIG. 2(a) is a cross-sectional view taken along line II(a)-II(a) of FIG. 1. FIG. 2(b) is a diagram viewed in the direction of an arrow II(b) of FIG. 1. FIG. 3 is a cross-sectional view orthogonal to an axial direction of the rotary electrical machine 1.

As shown in FIG. 1, the rotary electrical machine 1 includes a motor 2 and a housing 3. The motor 2 is, for example, a publicly known AC motor. The motor 2 includes a rotor 11 that is rotatable using the above-mentioned axial direction as the direction of the axis of rotation and a stator 12 that is disposed outside the rotor 11 in the radial direction. The motor 2 is adapted so that the rotor 11 is rotated by a rotating magnetic field that is generated in a case where alternating current flows through coils (not shown) wound around the stator 12.

The rotor 11 is, for example, a substantially cylindrical member that includes a permanent magnet (not shown). The rotor 11 is disposed inside the stator 12 in the radial direction. A rotating shaft 13 is fitted to the rotor 11. The configuration of the rotor 11 is not limited thereto. For example, the rotor 11 may include a plurality of salient poles that protrude in a direction orthogonal to the direction of the axis of rotation (that is, the motor 2 may be, for example, a switched reluctance motor). The stator 12 is a substantially tubular member that is formed of a magnetic member made of, for example, carbon steel or the like. The stator 12 is disposed outside the rotor 11 in the radial direction. The stator 12 is fitted to the housing 3. The stator 12 includes a substantially cylindrical yoke portion 21 that is formed over the entire circumference in the circumferential direction and a plurality of tooth portions 22 which each extend inward in the radial direction from a part of the yoke portion 21 in the circumferential direction. In this embodiment, six tooth portions 22 are arranged at substantially regular intervals in the circumferential direction.

The coil (not shown) is wound around each of the tooth portions 22. The coils are electrically connected to a power supply (not shown). The power supply supplies power, which causes alternating current to flow through the coils, to the motor 2. More specifically, the power supply supplies power so that alternating current having the same phase flows through a pair of coils wound around a pair of tooth portions 22 positioned on sides opposite to each other with the rotor 11 interposed therebetween among the six tooth portions 22. In this embodiment, the power supply supplies power so that three types of alternating current having phases different from each other by 120° flow through three pairs of coils, respectively (general three-phase alternating current).

In a case where the above-mentioned power is supplied to the coils in such a motor 2, a rotating magnetic field rotating in the circumferential direction in a predetermined cycle is generated and a magnetic force is generated between magnetic poles of the rotating magnetic field and the rotor 11. Accordingly, the rotor 11 is rotated together with the rotating shaft 13 so as to follow the rotating magnetic field.

The housing 3 is a case member that is opened on one side thereof in the axial direction and houses the motor 2. The housing 3 is formed of, for example, a die casting that is formed by a general die casting method and is made of an aluminum alloy. The material of the housing 3 does not necessarily need to be an aluminum alloy. For example, the housing 3 may be made of metal, such as iron, or may be formed of a member other than metal. Further, the housing 3 does not necessarily need to be formed by a die casting method and may be formed by another publicly known casting method or the like. The housing 3 includes a flow passage portion 30 in which a refrigerant flow passage 31 through which a refrigerant for cooling the motor 2 flows is formed. As shown in FIG. 1 and FIGS. 2(*a*) and 2(*b*), the flow passage portion 30 includes an inner peripheral wall 32, an outer peripheral wall 33, a bottom portion 34, an inlet portion 35, an outlet portion 36, and a partition wall portion 37.

The inner peripheral wall 32 extends in the axial direction and is formed over the entire circumference in the circumferential direction. An inner peripheral surface 32*a* of the inner peripheral wall 32 is in contact with an outer peripheral surface 12*a* of the stator 12. In this way, the stator 12 is fitted to the inner peripheral wall 32 of the housing 3. Like the inner peripheral wall 32, the outer peripheral wall 33 extends in the axial direction and is formed over the entire circumference in the circumferential direction. The outer peripheral wall 33 is disposed outside the inner peripheral wall 32 in the radial direction, and is disposed side by side with the inner peripheral wall 32 in the radial direction. The outer peripheral wall 33 is provided so that a gap having a predetermined size is formed between the inner peripheral wall 32 and the outer peripheral wall 33 in the radial direction. The size of the gap formed between the inner peripheral wall 32 and the outer peripheral wall 33 is, for example, substantially constant in the circumferential direction (see FIG. 3). The bottom portion 34 is provided on the other end portion of the housing 3 in the axial direction, and connects the inner peripheral wall 32 to the outer peripheral wall 33 in the radial direction. The refrigerant flow passage 31 having a substantially U-shaped cross-section (see FIG. 2(*a*)) is formed by the inner peripheral wall 32, the outer peripheral wall 33, and the bottom portion 34 to extend in the circumferential direction. In other words, the refrigerant flow passage 31 is formed between the inner peripheral wall 32 and the outer peripheral wall 33.

The inlet portion 35 is a portion at which an inlet 41 used to supply a refrigerant to the refrigerant flow passage 31 is formed. As shown in FIG. 1, the inlet 41 is opened to an inner peripheral surface 33*a* of the outer peripheral wall 33 at a predetermined position in the circumferential direction. Further, the outer peripheral wall 33 is provided with a supply pipe portion 42 that protrudes outward in the radial direction. A through-hole (supply flow passage 43) including the inlet 41 is formed from the tip of the supply pipe portion 42 to the inner peripheral surface 33*a* of the outer peripheral wall 33. The supply flow passage 43 is connected to the refrigerant flow passage 31 through the inlet 41. The supply flow passage 43 extends in a direction substantially orthogonal to the axial direction in this embodiment, but is not limited thereto.

The outlet portion 36 is a portion at which an outlet 44 used to discharge a refrigerant from the refrigerant flow passage 31 is formed. Like the inlet 41, the outlet 44 is opened to the inner peripheral surface 33*a* of the outer peripheral wall 33. The position of the outlet 44 in the circumferential direction is different from the position of the inlet 41 in the circumferential direction (the above-mentioned predetermined position). Further, the outer peripheral wall 33 is provided with a discharge pipe portion 45 that protrudes outward in the radial direction. A through-hole (discharge flow passage 46) including the outlet 44 is formed from the inner peripheral surface 33*a* of the outer peripheral wall 33 to the tip of the discharge pipe portion 45. The discharge flow passage 46 is connected to the refrigerant flow passage 31 through the outlet 44. In this embodiment, as viewed in the axial direction, the inlet portion 35 and the outlet portion 36 are disposed with the partition wall portion 37 interposed therebetween to be substantially symmetric with respect to a line (see FIG. 1). Further, the supply flow passage 43 and the discharge flow passage 46 are disposed substantially in parallel to each other, but are not limited thereto.

As shown in FIG. 1, the refrigerant flow passage 31 is broadly divided into two portions by, for example, an imaginary straight line L1 that extends in the radial direction and that passes through the center of the inlet 41 and an imaginary straight line L2 that extends in the radial direction and that passes through the center of the outlet 44. That is, the refrigerant flow passage 31 is divided into a first flow passage 51 of which the length from the inlet 41 to the outlet 44 in the circumferential direction is a predetermined length and a second flow passage 52 of which the length from the inlet 41 to the outlet 44 in the circumferential direction is shorter than that of the first flow passage 51. The first flow passage 51 occupies substantially the entire circumference of the refrigerant flow passage 31. In this embodiment, the width of the first flow passage 51 in the radial direction is substantially constant in the circumferential direction (see FIG. 3). The second flow passage 52 is a remaining portion of the refrigerant flow passage 31 that excludes the first flow passage 51.

The partition wall portion 37 is made to suppress the outflow of a refrigerant, which flows into the refrigerant flow passage 31 through the inlet 41, from the outlet 44 through the short second flow passage 52. As shown in FIG. 1, the partition wall portion 37 is provided in a part (in the middle of the second flow passage 52) in the circumferential direction, and is disposed between the inner peripheral wall 32 and the outer peripheral wall 33 in the radial direction. The partition wall portion 37 is formed integrally with the inner peripheral wall 32 and the outer peripheral wall 33 and extends in the axial direction (see FIG. 2(*a*)). The partition wall portion 37 may be provided as a member separate from the inner peripheral wall 32 and the outer peripheral wall 33. More details of the partition wall portion 37 will be described later.

Further, for example, a substantially disc-like lid member 38 is fixed to one end portion of the housing 3 in the axial direction by a fixture (not shown). Accordingly, the refrigerant flow passage 31 is sealed except for the inlet 41 and the outlet 44.

In the above-mentioned refrigerant flow passage 31, most of a refrigerant, which flows in through the inlet 41, flows into the first flow passage 51, flows through the first flow passage 51 over substantially the entire circumference in the circumferential direction, and flows out through the outlet 44. Since the refrigerant flows in this way, the housing 3 is cooled by the refrigerant and the motor 2 in contact with the housing 3 is further cooled by thermal conduction.

Here, in a case where the rotor 11 is rotating, a magnetic force intermittently acts between the tooth portions 22 of the stator 12 and the rotor 11. Accordingly, the tooth portions 22 vibrate, and the vibration is transmitted to the entire stator 12. In a case where such vibration is transmitted to the inner peripheral wall 32 from the stator 12 and is further transmitted to the outer peripheral wall 33 from the inner peripheral wall 32 through, for example, the partition wall portion 37, the outer peripheral wall 33 is vibrated and noise may be generated. A method of suppressing the transmission of vibration from the inner peripheral wall 32 to the outer peripheral wall 33 without providing the partition wall portion 37 is conceivable as one of the measures against noise. However, in this case, there is a concern that the second flow passage 52 will be short-circuited between the inlet 41 and the outlet 44 and that a large amount of a refrigerant will likely flow into the second flow passage 52. For this reason, there may be a problem in that the amount of a refrigerant flowing through the first flow passage 51 is significantly reduced and that a cooling function significantly deteriorates. Accordingly, in order to suppress the transmission of the vibration of the stator to the outer peripheral wall 33 of the housing 3 while suppressing the deterioration of a cooling function, the partition wall portion 37 of the housing 3 is adapted as follows.

(Partition Wall Portion)

The configuration of the partition wall portion 37 will continue to be described with reference to FIGS. 1 to 3. As shown in FIGS. 1 to 3, a slit 53 is formed in the partition wall portion 37. For example, the slit 53 extends linearly as viewed in the axial direction. The slit 53 allows spaces, which are formed on both sides of the partition wall portion 37 in the circumferential direction, to communicate with each other. In other words, the slit 53 penetrates the partition wall portion 37 in the circumferential direction (see FIG. 1). In other words, a gap is formed between the radial outer portion and the radial inner portion of the partition wall portion 37 by the slit 53. The transmission of the vibration of the stator 12, which is caused by the rotation of the rotor 11, from the inner peripheral wall 32 to the outer peripheral wall 33 through the partition wall portion 37 is suppressed by such a gap.

Further, the slit 53 extends in the axial direction (see FIG. 2(a)). In the axial direction, the slit 53 further extends to one side than one end surface 12b of the stator 12 and further extends to the other side than the other end surface 12c of the stator 12. Further, in other words, in the axial direction, the slit 53 further extends to one side than one end of the outer peripheral surface 12a of the stator 12 and further extends to the other side than the other end of the outer peripheral surface 12a. Furthermore, in other words, the slit 53 extends in the axial direction from at least the position of one end of the outer peripheral surface 12a of the stator 12 to the position of the other end thereof. That is, in any cross-section orthogonal to the axial direction (see, for example, FIG. 3), a portion of the inner peripheral wall 32 which is in contact with the stator 12 and the outer peripheral wall 33 are separated from each other by the slit 53. Accordingly, the transmission of the vibration of the stator 12 from the inner peripheral wall 32 to the outer peripheral wall 33 through the partition wall portion 37 is effectively suppressed.

However, since a short-circuit passage reaching the outlet 44 from the inlet 41 is formed in the second flow passage 52 by the slit 53, there is a concern that the amount of a refrigerant flowing into the second flow passage 52 will be increased, the amount of a refrigerant flowing through the first flow passage 51 will be reduced, and a cooling function will deteriorate. Accordingly, as shown in FIG. 3, a width W1 of the slit 53 in the radial direction is set to be smaller than a width W2 of the first flow passage 51 in the radial direction (the gap between the inner peripheral wall 32 and the outer peripheral wall 33 in the radial direction). For this reason, since the flow passage resistance of the second flow passage 52 is increased, the flow of a refrigerant into the second flow passage 52 is suppressed.

As described above, the gap is formed between the radial outer portion and the radial inner portion of the partition wall portion 37 by the slit 53. Accordingly, the transmission of the vibration of the stator 12, which is caused by the rotation of the rotor 11, from the inner peripheral wall 32 to the outer peripheral wall 33 can be suppressed. Further, since the width W1 of the slit 53 is smaller than the width W2 of the first flow passage 51 (the gap between the inner peripheral wall 32 and the outer peripheral wall 33 in the radial direction), the flow passage resistance of the second flow passage 52 can be increased. As a result, the flow of a refrigerant into the second flow passage 52 can be suppressed as much as possible. Accordingly, it is possible to suppress the transmission of the vibration of the stator 12 to the outer peripheral wall 33 of the housing 3 while suppressing the deterioration of a cooling function.

Further, the slit 53 extends in the axial direction from at least the position of one end of the outer peripheral surface 12a of the stator 12 to the position of the other end thereof. That is, in any cross-section orthogonal to the axial direction, a portion of the inner peripheral wall 32 which is in contact with the stator 12 and the outer peripheral wall 33 are separated from each other by the slit 53. Accordingly, the transmission of the vibration of the stator 12 from the inner peripheral wall 32 to the outer peripheral wall 33 through the partition wall portion 37 can be effectively suppressed.

Next, a modification example in which the embodiment is modified will be described. Here, components having the same configuration as those of the above-mentioned embodiment will be denoted by the same reference numerals as those of the above-mentioned embodiment, and the description thereof will be appropriately omitted.

Figure 4:
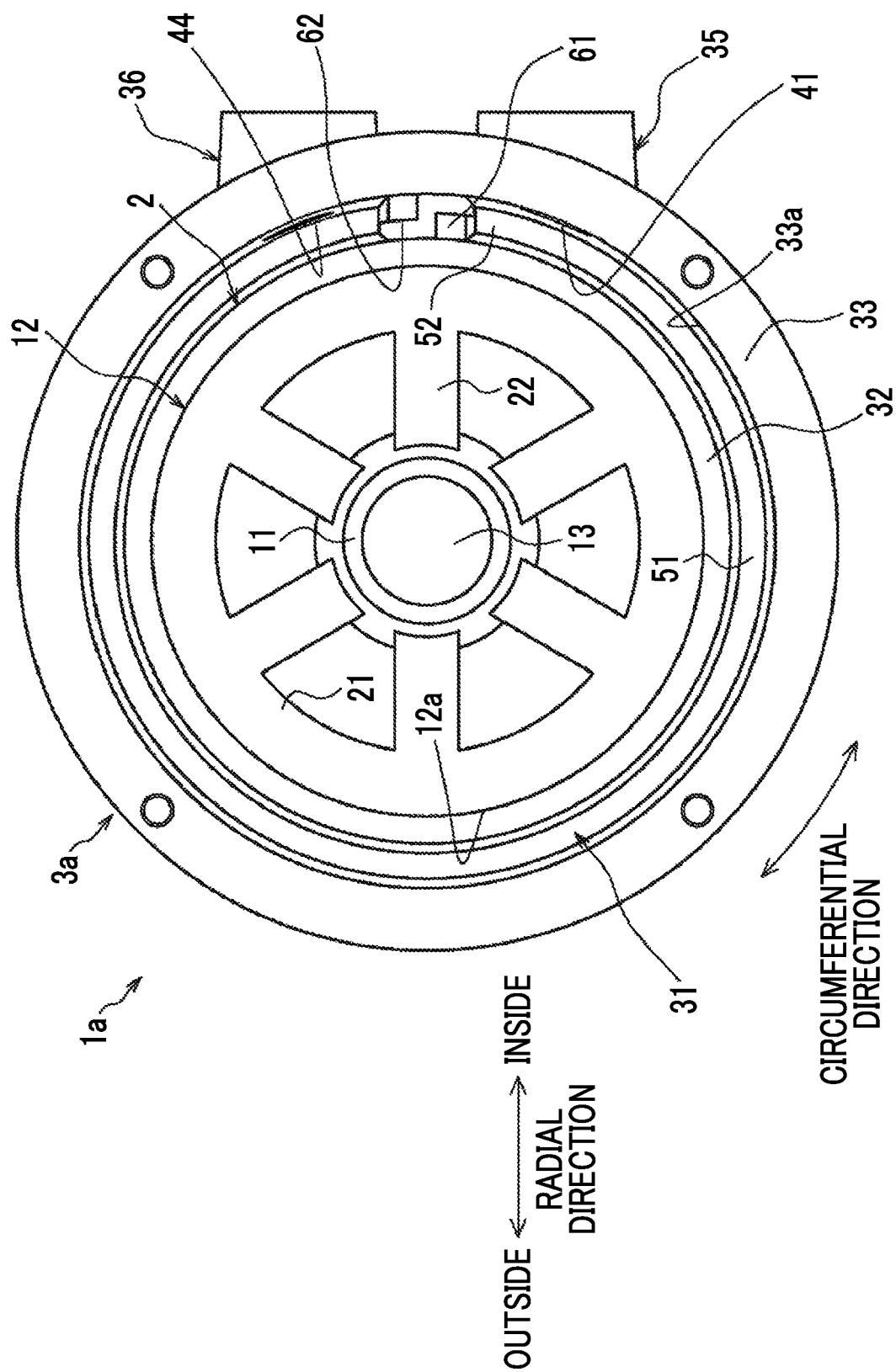
FIG. 4 is a plan view of a rotary electrical machine according to a modification example.

(1) The slit 53 extends linearly as viewed in the axial direction in the above-mentioned embodiment, but the present invention is not limited thereto. For example, as shown in FIG. 4, a slit 62, which has a substantially S shape as viewed in the axial direction, may be formed in a partition wall portion 61 in a housing 3a of a rotary electrical machine 1a. Like the above-mentioned slit 53, the slit 62 allows spaces which are formed on both sides of the partition wall portion 61 in the circumferential direction to communicate with each other. In other words, such a slit 62 also penetrates the partition wall portion 61 in the circumferential direction. As long as the slit 62 is formed to penetrate the partition wall portion 61 in the circumferential direction and has a width smaller than the width of the first flow passage 51, the slit 62 may be bent in this way.

Figure 5:
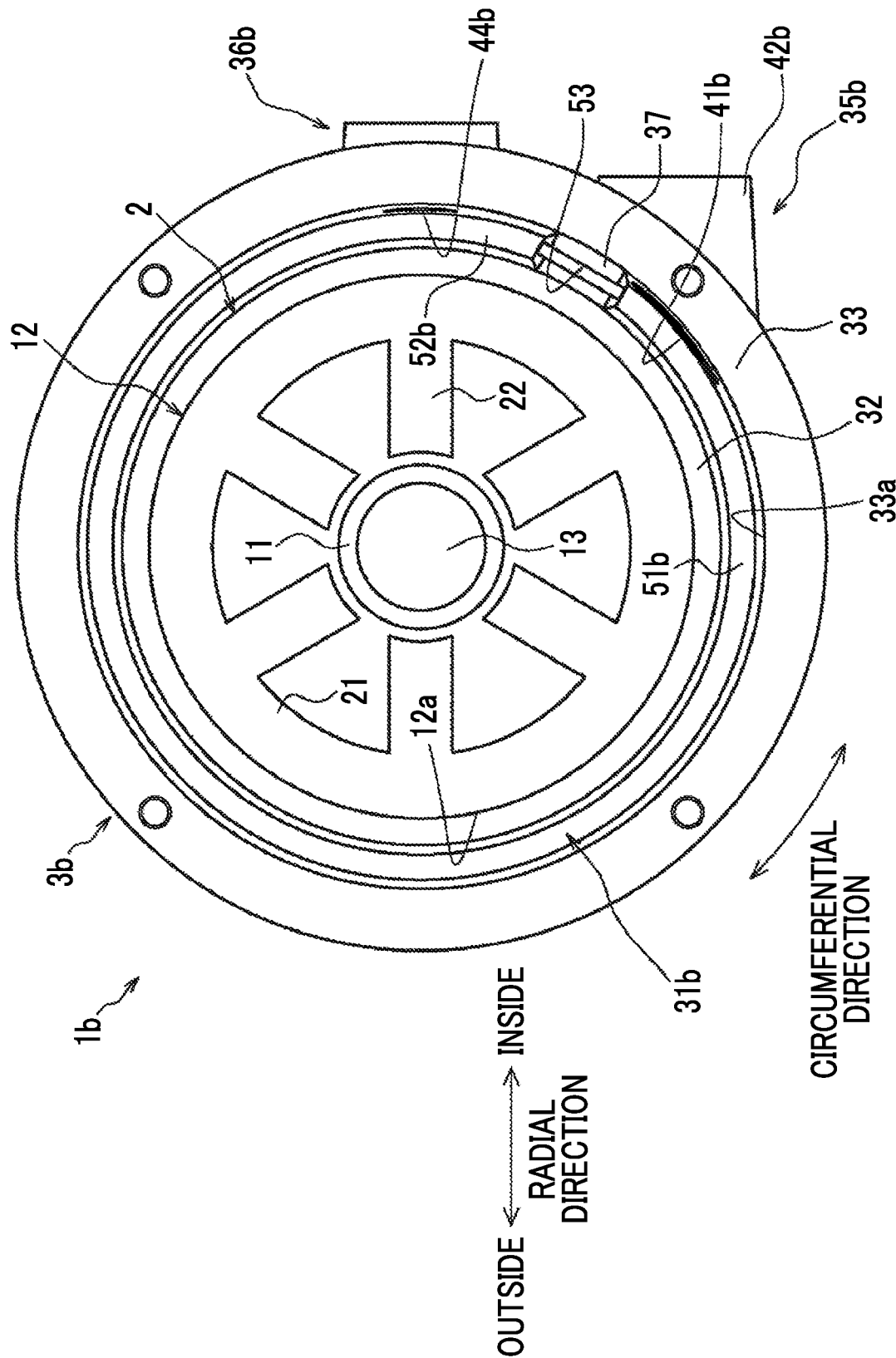
FIG. 5 is a plan view of a rotary electrical machine according to another modification example.

(2) In order to further suppress the deterioration of a cooling function, a housing 3b (see FIG. 5) of a rotary electrical machine 1b may be adapted as follows. FIG. 5 is a plan view of the rotary electrical machine 1b. FIGS. 6(a) and 6(b) are diagrams showing a configuration in the vicinity of an inlet 41b of a refrigerant flow passage 31b. As shown in FIG. 5, an inlet portion 35b in which an inlet 41b is formed and an outlet portion 36b in which an outlet 44b is formed may not be disposed to be symmetric with respect to a line as viewed in the axial direction. More specifically, a supply flow passage 43b may be disposed to be relatively inclined toward a second flow passage 52b as compared to the embodiment described above. In detail, a relationship between the supply flow passage 43b formed in a supply pipe portion 42b and an outer edge 32b (see FIGS. 6(a) and 6(b)) of the inner peripheral wall 32 is as follows. That is, a center line passing through the center of the supply flow passage 43b in a width direction of a flow passage is defined as a center line L3. A tangent to the outer edge 32b which passes through an intersection P between the center line L3 and the outer edge 32b of the inner peripheral wall 32 is defined as a tangent L4. A straight line of the tangent L4 which extends from the intersection P toward the first flow passage 51b is defined as a first straight line L5. Further, a straight line of the tangent L4 which extends from the intersection P toward the second flow passage 52b is defined as a second straight line L6. In this case, an angle θ1 between the center line L3 and the first straight line L5 is an obtuse angle and an angle θ2 between the center line L3 and the second straight line L6 is an acute angle. Accordingly, in a case where a refrigerant that has flowed into the refrigerant flow passage 31b through the supply flow passage 43b hits the outer edge 32b of the inner peripheral wall 32, the refrigerant easily flows toward the first flow passage 51b and the flow of the refrigerant into the second flow passage 52b is suppressed. Therefore, the deterioration of a cooling function can be more effectively suppressed. For example, as shown in FIGS. 6(a) and 6(b), the angle θ1 is about 150 degrees and the angle θ2 is about 30 degrees.

Figure 7:
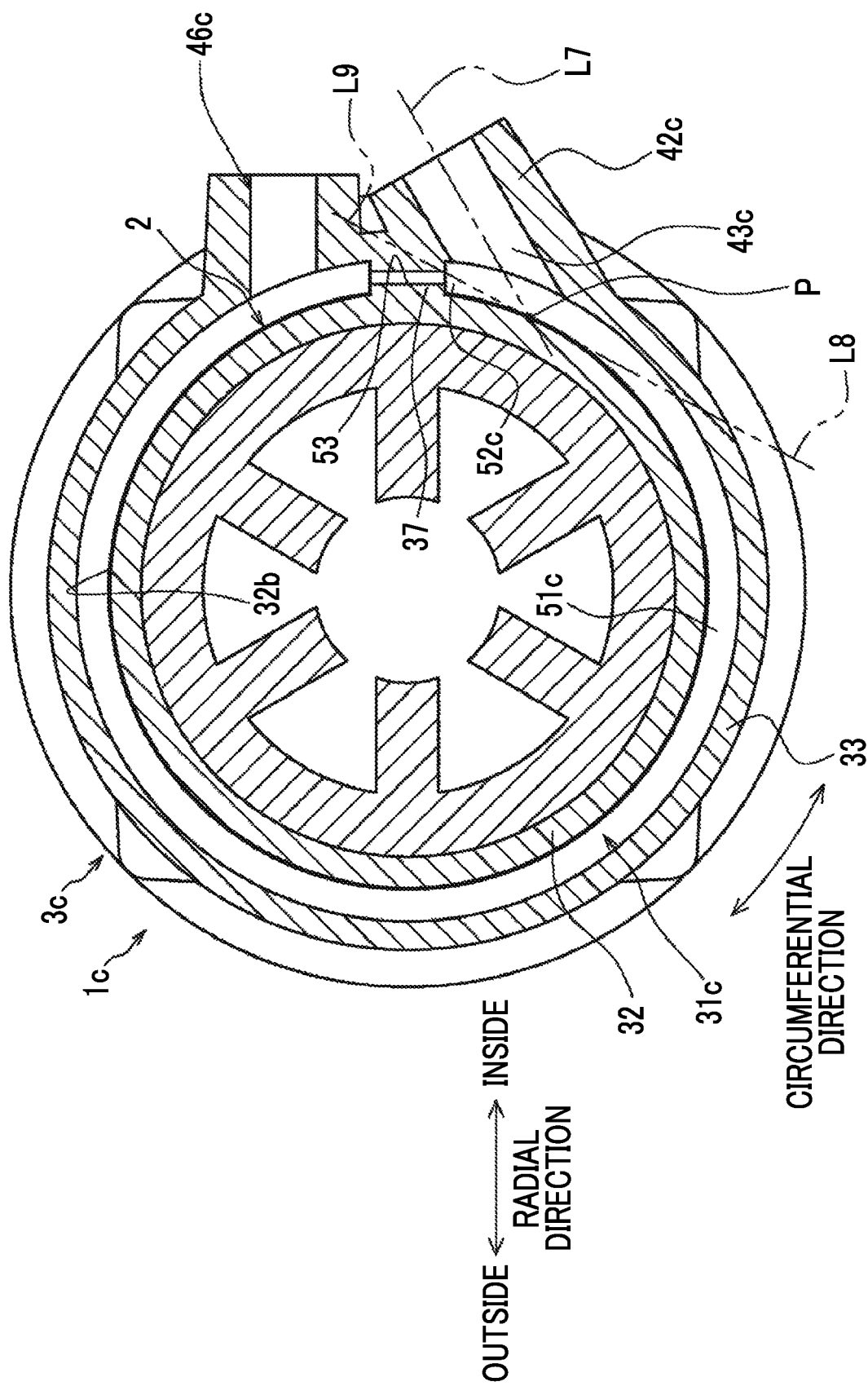
FIG. 7 is a cross-sectional view, which is orthogonal to an axial direction, of a rotary electrical machine according to still another modification example.

(3) As in the modification example of (2), in order to further suppress the deterioration of a cooling function, a housing 3c (see FIG. 7) of a rotary electrical machine 1c may be adapted as follows. That is, a supply pipe portion 42c may be provided so that a supply flow passage 43c is inclined toward a second flow passage 52c without being parallel to a discharge flow passage 46c as shown in FIG. 7. Accordingly, an angle between a center line L7 of the supply flow passage 43c and a first straight line L8 corresponding to the above-mentioned first straight line L5 can be set to an obtuse angle. Further, an angle between the center line L7 and a second straight line L9 corresponding to the above-mentioned second straight line L6 can be set to an acute angle. In this way, a refrigerant that has flowed into the refrigerant flow passage 31c may be made to easily flow toward a first flow passage 51c and the flow of the refrigerant into the second flow passage 52c may be suppressed.

(4) The number of the tooth portions 22 of the stator 12 is six and three-phase alternating current flows through the coils in the embodiment described above, but the present invention is not limited thereto. The number of the tooth portions 22 may not be six, and current (for example, single-phase alternating current) other than three-phase alternating current may flow through the coils. Furthermore, the tooth portions 22 do not necessarily need to be arranged at regular intervals in the circumferential direction. All the tooth portions 22 do not necessarily need to have the same size.

(5) The slit 53 or the like extends in the axial direction from at least the position of one end of the outer peripheral surface 12a of the stator 12 to the position of the other end thereof in the embodiment described above, but the present invention is not limited thereto. For example, the slit may be formed to be in the range of the stator 12 in the axial direction.

(6) The width of the first flow passage 51 is constant in the circumferential direction in the embodiment described above, but the present invention is not limited thereto. The width of the first flow passage 51 may not be constant in the circumferential direction. In this case, in order to increase the flow passage resistance of the second flow passage 52, it is preferable that at least the width of the narrowest portion of the slit 53 is smaller than the width of the narrowest portion of the first flow passage 51.

(7) The supply flow passage 43 and the discharge flow passage 46 are substantially orthogonal to the axial direction in the embodiment described above, but the present invention is not limited thereto. The supply flow passage 43 and the discharge flow passage 46 do not necessarily need to be orthogonal to the axial direction.

(8) The motor 2 is an AC motor in the embodiment described above, but is not limited thereto. The present invention may be applied to a DC motor.

(9) The rotary electrical machine 1 and the like include the motor 2 for rotating the rotating shaft 13 in the embodiment described above, but the present invention is not limited thereto. For example, a generator that generates an electromotive force on coils via electromagnetic induction in a case where the rotating shaft 13 is rotated via an external force may be provided instead of the motor 2. Alternatively, the motor 2 may be used as a generator. A magnetic force is intermittently generated between the rotor 11 and the tooth portions 22 even in such a case, so that the tooth portions 22 can be vibrated. Accordingly, separating the inner peripheral wall 32 and the outer peripheral wall 33 from each other via the slit 53 is effective.

Reference Example

Next, a reference example for suppressing the flow of a refrigerant into the second flow passage, which is similar to the modification example of (2), will be described with reference to FIGS. 8 and 9. Here, components having the same configuration as those of the embodiment described above will be denoted by the same reference numerals as those of the above-mentioned embodiment, and the description thereof will be appropriately omitted.

Figure 8:
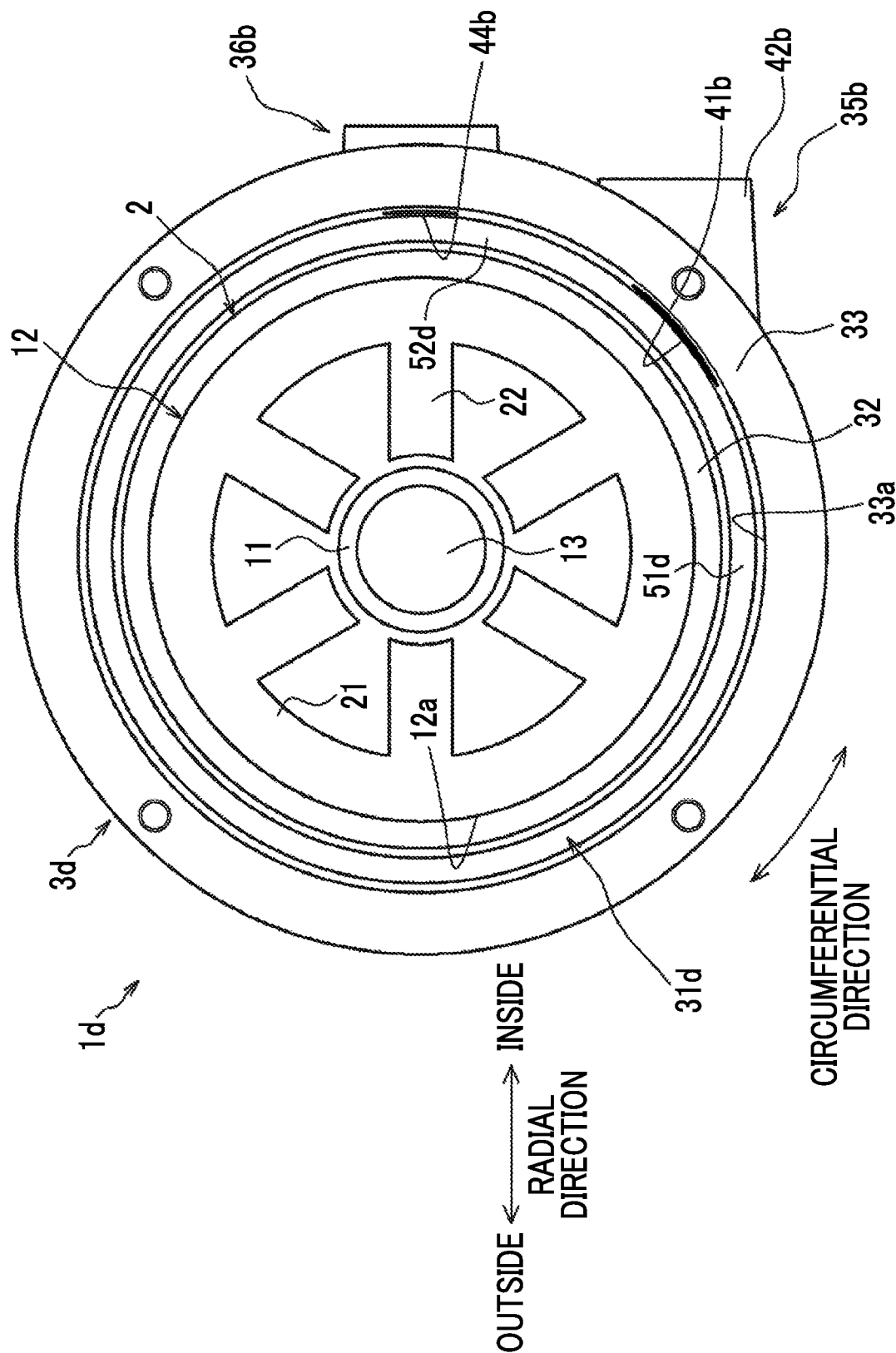
FIG. 8 is a plan view of a rotary electrical machine according to a reference example.
Figure 9:
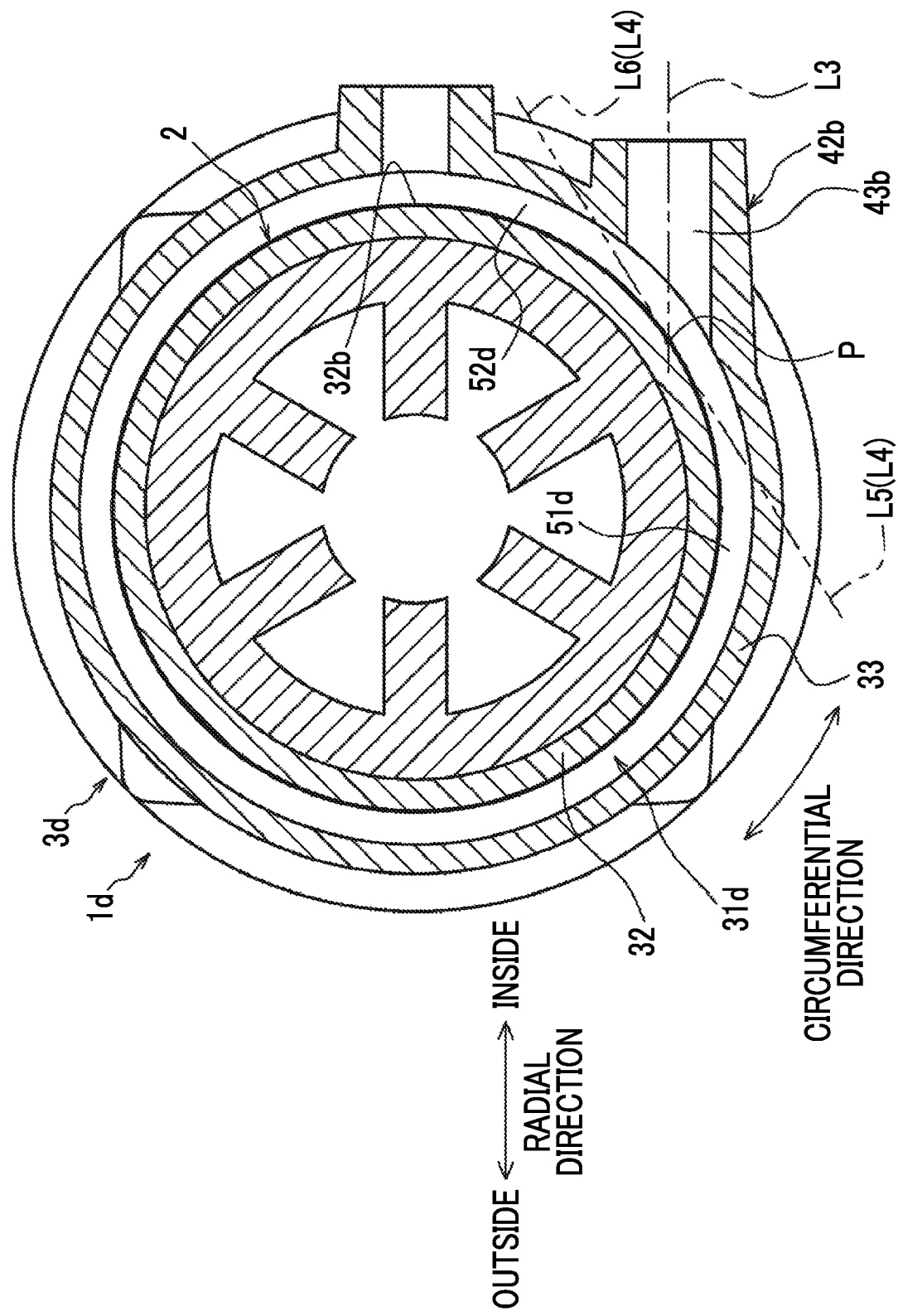
FIG. 9 is a cross-sectional view, which is orthogonal to an axial direction, of the rotary electrical machine according to the reference example.

As shown in FIGS. 8 and 9, a housing 3d of a rotary electrical machine 1d is not provided with a partition wall portion unlike the above-mentioned housing 3 and the like. That is, a refrigerant flow passage 31d having substantially the same width is provided over the entire circumference in the circumferential direction, and is divided into a first flow passage 51d and a second flow passage 52d. Other than that, the configuration of the housing 3d is the same as that of the housing 3b. That is, the housing 3d includes the inlet portion 35b, the outlet portion 36b, the inlet 41b, the supply pipe portion 42b, the supply flow passage 43b, and the outlet 44b described above. Accordingly, in a case where an angle between the center line L3 and the first straight line L5 is set to an obtuse angle and an angle between the center line L3 and the second straight line L6 is set to an acute angle (see FIG. 9), a refrigerant can be made to easily flow toward the first flow passage 51d and the flow of the refrigerant into the second flow passage 52d can be suppressed.

That is, even in the following rotary electrical machine, it is possible to suppress the transmission of the vibration of the stator 12 to the outer peripheral wall 33 of the housing 3d while suppressing the deterioration of a cooling function.

A rotary electrical machine comprising:
    a rotor that is rotatable using a predetermined axial direction as a direction of an axis of rotation;
    a stator that is disposed outside the rotor in a radial direction of the rotor; and a housing which includes a flow passage portion in which a refrigerant flow passage through which a refrigerant flows is formed and which houses the rotor and the stator, wherein the flow passage portion includes an inner peripheral wall that is in contact with an outer peripheral surface of the stator, an outer peripheral wall that is disposed outside the inner peripheral wall in the radial direction and that is provided to form the refrigerant flow passage between the outer peripheral wall and the inner peripheral wall, an inlet portion in which an inlet of the refrigerant flow passage is formed at a predetermined position in a circumferential direction orthogonal to both the axial direction and the radial direction, and an outlet portion in which an outlet of the refrigerant flow passage is formed at a position different from the predetermined position in the circumferential direction, the refrigerant flow passage includes a first flow passage of which a length from the inlet to the outlet in the circumferential direction is a predetermined length, and a second flow passage of which a length from the inlet to the outlet in the circumferential direction is shorter than that of the first flow passage, a supply flow passage connected to the refrigerant flow passage is formed in the inlet portion, and in a case where, of a tangent to an outer edge of the inner peripheral wall that passes through an intersection between a center line of the supply flow passage and the outer edge, a straight line extending from the intersection toward the first flow passage is defined as a first straight line and a straight line extending from the intersection toward the second flow passage is defined as a second straight line as viewed in the axial direction, an angle between the center line and the first straight line is an obtuse angle and an angle between the center line and the second straight line is an acute angle.

REFERENCE SIGNS LIST

1: rotary electrical machine
3: housing
11: rotor
12: stator
12a: outer peripheral surface
30: flow passage portion
31: refrigerant flow passage
32: inner peripheral wall
32b: outer edge
33: outer peripheral wall
35: inlet portion
36: outlet portion
37: partition wall portion
41: inlet
43: supply flow passage
44: outlet
51: first flow passage
52: second flow passage
53: slit
L3: center line
L4: tangent
L5: first straight line
L6: second straight line
P: intersection
W1: width
W2: width
θ1: angle
θ2: angle

The invention claimed is:

1. A rotary electrical machine comprising:

a rotor that is rotatable using a predetermined axial direction as a direction of an axis of rotation;

a stator that is disposed outside the rotor in a radial direction of the rotor; and a housing which includes a flow passage portion in which a refrigerant flow passage through which a refrigerant flows is formed and which houses the rotor and the stator with one axial end open and the other end closed, wherein the flow passage portion includes an inner peripheral wall that is in contact with an outer peripheral surface of the stator, an outer peripheral wall that is disposed outside the inner peripheral wall in the radial direction and that is provided to form the refrigerant flow passage between the outer peripheral wall and the inner peripheral wall, a bottom portion that is provided at the other end of the housing in the axial direction so as to be disposed on the other axial side of the rotor and the stator, and connects the inner peripheral wall and the outer peripheral wall in the radial direction, an inlet portion in which an inlet of the refrigerant flow passage is formed at a predetermined position in a circumferential direction orthogonal to both the axial direction and the radial direction, and an outlet portion in which an outlet of the refrigerant flow passage is formed at a position different from the predetermined position in the circumferential direction, the refrigerant flow passage includes a first flow passage of which a length from the inlet to the outlet in the circumferential direction is a predetermined length, and a second flow passage of which a length from the inlet to the outlet in the circumferential direction is shorter than that of the first flow passage, the second flow passage is provided with a partition wall portion between the inner peripheral wall and the outer peripheral wall in the radial direction, wherein the partition wall portion includes:

an outer partition wall portion that is a portion that projects inward in the radial direction from the outer peripheral wall, and an inner partition wall portion that is a portion that projects outward in the radial direction from the inner peripheral wall, the outer partition wall portion is located on a straight line that passes through the inner partition portion and extends along the radial direction, a slit penetrating in the circumferential direction is formed between the outer partition wall portion and the inner partition wall portion, a width of the slit is smaller than a width of the first flow passage, a length of the refrigerant flow passage and the slit in the axial direction is longer than a length of the stator in the axial direction, a lid member is fixed to one end of the housing in the axial direction, so that the rotor and the stator are housed inside the housing, and the refrigerant flow passage except for the inlet portion and the outlet portion is sealed.

2. The rotary electrical machine according to claim 1, wherein the refrigerant flow passage and the slit have one end in the axial direction located on one side of the one end in the axial direction of the stator and have the other end in the axial direction is located on the other side of the other end in the axial direction of the stator.

3. The rotary electrical machine according to claim 1, wherein a supply flow passage connected to the refrigerant flow passage is formed in the inlet portion, and in a case where, of a tangent to an outer edge of the inner peripheral wall that passes through an intersection between a center line of the supply flow passage and the outer edge, a straight line extending from the intersection toward the first flow passage is defined as a first straight line and a straight line extending from the intersection toward the second flow passage is defined as a second straight line as viewed in the axial direction, an angle between the center line and the first straight line is an obtuse angle and an angle between the center line and the second straight line is an acute angle.

4. The rotary electrical machine according to claim 2, wherein a supply flow passage connected to the refrigerant flow passage is formed in the inlet portion, and in a case where, of a tangent to an outer edge of the inner peripheral wall that passes through an intersection between a center line of the supply flow passage and the outer edge, a straight line extending from the intersection toward the first flow passage is defined as a first straight line and a straight line extending from the intersection toward the second flow passage is defined as a second straight line as viewed in the axial direction, an angle between the center line and the first straight line is an obtuse angle and an angle between the center line and the second straight line is an acute angle.

\* \* \* \* \*